United States Patent [19]

Fisher et al.

[11] 4,397,381

[45] Aug. 9, 1983

[54] MAGNETIC BRAKES AND CLUTCHES

[76] Inventors: Charles B. Fisher, 2850 Hill Park Rd., Montreal, Quebec, Canada, H3H 1T1; Sidney T. Fisher, 53 Morrison Ave., Montreal, Quebec, Canada, H3R 1K3

[21] Appl. No.: 325,144

[22] Filed: Nov. 27, 1981

[51] Int. Cl.³ .............. F16D 27/02; F16D 13/10; F16D 49/00
[52] U.S. Cl. .................. 192/84 T; 188/161; 335/215
[58] Field of Search .............. 192/84 T; 188/161; 335/3, 215; 310/26

[56] References Cited

U.S. PATENT DOCUMENTS 3,129,798  4/1964  Rabinow .................. 192/84 T

FOREIGN PATENT DOCUMENTS 685863  9/1979  U.S.S.R. .................. 192/84 T

OTHER PUBLICATIONS

Standard Handbook for Mechanical Engineers, McGraw-Hill, 7th Edition, pp. 8-54, 8-55, 8-60, and 8-61, 1951.

McGraw-Hill Encyclopedia of Science and Technology 1977, vol. 1, pp. 748-750; vol. 3, pp. 235 and 236.

Primary Examiner—Allan D. Herrmann

[57] ABSTRACT

Drum-type brakes and band-type clutches which are activated by expansion or compression, or both, of one or more concentric magnetic members, with conducting windings carrying electric currents. Circular annular mating members carrying one or more conducting windings expand or contract in diameter, due to magnetic forces caused by currents in the winding or windings, and operate as a brake or a clutch.

7 Claims, 5 Drawing Figures

MAGNETIC BRAKES AND CLUTCHES

BACKGROUND OF THE INVENTION

This invention discloses frictional rotational energy transfer devices, such as drum-type brakes and band-type clutches, containing two concentric mating members, in which the external member may be contracted or the internal member may be expanded, by magnetic force, or both members may change, so that contact occurs between intervening friction members when the appropriate magnetic fields are established, and rotational energy may be transferred from one mating member to the other.

In the prior art magnetic shrink fits are disclosed, in which an internal mating member has an unstressed external diameter greater than the unstressed internal diameter of the external mating member, and in which the external magnetic mating member is increased and not decreased in diameter due to magnetic forces.

Magnetic brakes and clutches of the prior art use solenoids or similar devices to actuate conventional mechanical brakes and clutches.

BRIEF DESCRIPTION OF THE INVENTION

Drum-type brakes and band-type clutches are frictional rotational energy transfer devices, and have common characteristics, in that an external circular annular mating member and a concentric circular internal mating member, with or without one or more intervening friction members, rotate without mutual friction, until the clutch or brake is actuated, when one or both mating members change diameter, so that rotational friction occurs between them, which transfers energy between mating members, and both mating members may be caused to rotate in the same direction at the same speed.

For convenience, in this disclosure, we designate as a brake, a device which transfers energy between the mating members when current flows in magnetizing windings, and designate as a clutch, a device which transfers energy between mating members when no current flows in magnetizing windings.

In this disclosure, an external annular magnetic mating member is caused to expand or contract in diameter, by magnetic forces generated by one or more conducting windings, carrying current, located around the annulus, and an internal annular magnetic mating member is caused to expand or contract in diameter by magnetic forces generated by one or more conducting windings, carrying current, located around the annulus.

DETAILED DESCRIPTION OF THE INVENTION

Figure 1:
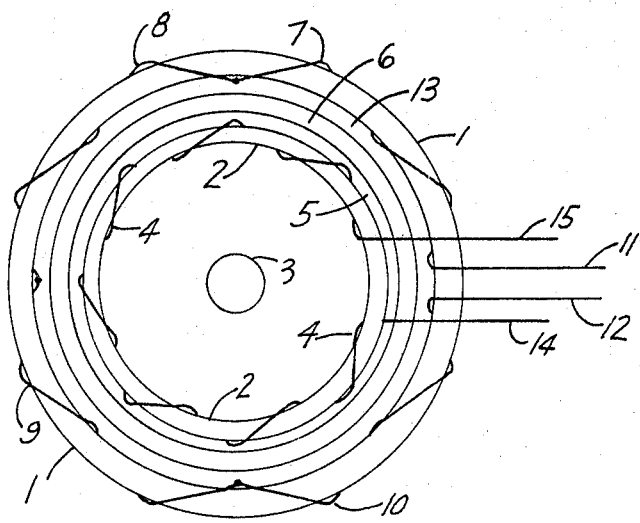
FIG. 1 shows a simplified diagram of a magnetic clutch according to the invention.

FIG. 1 shows a simplified diagram of a magnetic clutch according to the invention. An external circular annular magnetic mating member 1, which is attached to an external mechanism, not shown, carries four alternate insulated conducting windings 7, 8, 9 and 10 of opposed directions of windings, in series, the number of turns wound in one direction being substantially equal to the number of turns wound in the opposed direction, with the external leads for the combined windings designated 11 and 12. A substantially non-magnetic friction lining 13 is internally attached to member 1, and is notched to permit the turns of windings 7, 8, 9, and 10 to pass around member 1.

Shaft 3 is concentric with member 1, and is concentric with and attached to internal circular annular magnetic mating member 2. Internal member 2 carries insulated conducting winding 4, with all turns in the same direction, and with external leads 14 and 15. Mating member 2 has externally attached friction lining 5. Friction linings 5 and 13 are strongly pressed together when no current flows in the windings, so that the clutch is engaged.

When a d-c voltage is applied to leads 11 and 12, external mating member 1 expands, due to the opposed magnetic fields, and when a d-c voltage is applied to leads 14 and 15, internal mating member 2 contracts, due to the aiding magnetic field, so that annular air gap 6 appears between friction linings 5 and 13, and the clutch is then disengaged.

It is apparent that one or both of friction linings 5 and 13 may be omitted, and that windings 7, 8, 9 and 10, or winding 4, may be omitted, and the mating member without windings need not be magnetic. If both mating members are magnetic and if both friction linings are omitted, a non-magnetic separator may take the place of one of the friction linings.

Figure 2:
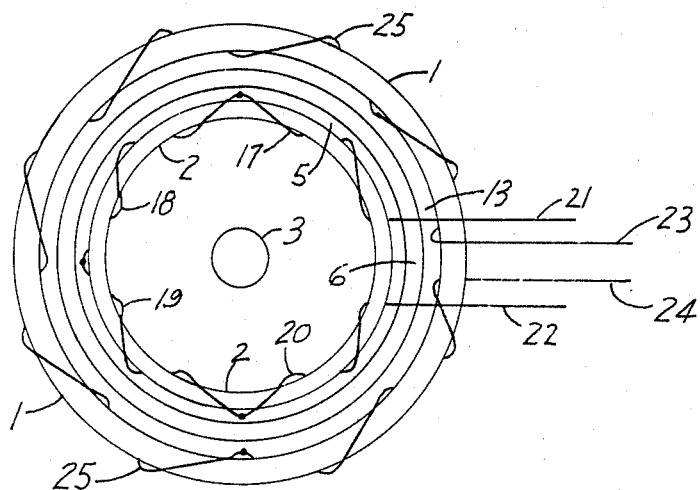
FIG. 2 shows a simplified diagram of a magnetic brake according to the invention.

FIG. 2 shows a simplified diagram of a magnetic brake according to the invention. An external circular annular magnetic mating member 1, attached to an external mechanism not shown, carries insulated conducting winding 25, with all turns in the same direction, and with external leads 23 and 24. A non-magnetic friction lining 13 is internally attached to member 1, and is notched to permit the turns of winding 25 to pass around member 1.

Shaft 3 is concentric with, and is attached to, internal circular annular magnetic mating member 2. Internal member 2 carries four alternate insulated conducting windings 17, 18, 19 and 20, of opposite directions of winding, connected in series, with external leads 21 and 22 for the combined windings. Mating member 2 has externally attached friction lining 5. Friction lining 5 and 13 are separated by annular air space 6, when no current flows in the windings, and the brake is not actuated.

When a d-c voltage is applied to leads 21 and 22, internal mating member 2 expands, due to the opposed magnetic fields in member 2, and when a d-c voltage is applied to leads 23 and 24, external mating member 1 contracts, due to the aiding magnetic fields in member 1, so that annular air gap 6 is closed, and friction linings 5 and 13 press strongly against each other, so that the brake is actuated.

It is apparent that one or both of friction linings 5 and 13 may be omitted, and that windings 17, 18, 19 and 20, or winding 25, may be omitted, and the mating member without windings need not be magnetic. If both mating members are magnetic, and if both friction linings are omitted, a non-magnetic separator may take the place of the friction linings.

Figure 3:
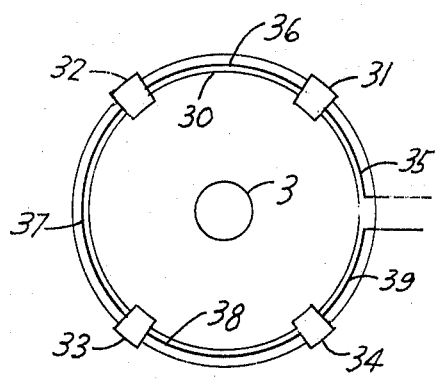
FIG. 3 shows a different winding arrangement for FIGS. 1 and 2.

FIG. 3 shows another winding arrangement. In FIG. 1 and 2 the windings on the mating members are shown as toroidal in the drawings. It is evident that each of these windings, of one direction of winding, may consist of a concentrated multi-layer winding, with the same direction of winding as the toroidal winding of which it is the equivalent. This arrangement is shown in FIG. 3.

Circular annular magnetic mating number 30, with coils 31, 32, 33 and 34, connected in series to an external circuit by leads 35, 36, 37, 38 and 39, may be substitution for one or more of mating numbers 1 and 2 of FIG. 1, and 1 and 2 of FIG. 2, with their associated windings. Windings 31, 32, 33 and 34 are concentrated coils which may have one or more layers of turns, with all the turns of any one coil wound in the same direction. When series-aiding magnetic fields are required, as in internal member 2 of FIG. 1 and external member 1 of FIG. 2, coils 31 32, 33 and 34 are connected in series, so that their magnetic fields are in aiding relationship circumferentially. When adjacent opposed magnetic fields are required, as in external member 1 of FIG. 1 and internal member 2 of FIG. 2, coils 31, 32, 33 and 34 are connected in series, with polarities such that alternate coils generate opposed circumferential magnetic fields.

Figure 4:
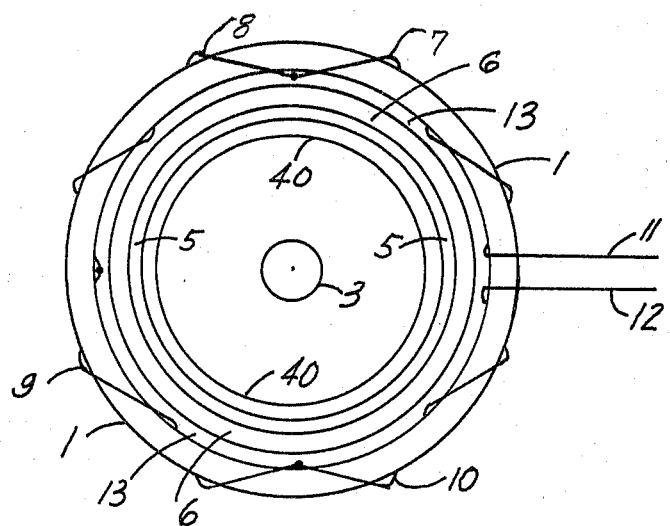
FIG. 4 shows a simplified diagram of a frictional rotational torque transfer device with a conducting insulated winding on only the external mating member, according to the invention.

FIG. 4 shows a simplified diagram of a frictional rotational torque transfer device with a conducting insulated winding on only the external mating member.

In FIG. 4 an external annular magnetic mating member 1, which is attached to an external mechanism not shown, carries four insulated conducting windings 7, 8, 9 and 10, of alternately opposed directions of winding in series, the number of turns being wound in each direction being substantially equal, with external leads 11 and 12. A non-magnetic friction lining 13 is internally attached to member 1, and is notched to permit the passage of turns of windings 7, 8, 9 and 10.

Shaft 3 is concentric with member 1 and is concentric with and attached to internal circular annular mating member 40, which has externally attached friction lining 5. Friction members 5 and 13 are separated by annular air space 6 when energy is not transferred by friction between members 1 and 40, and air space 6 is reduced to zero when energy is transferred by friction.

Figure 5:
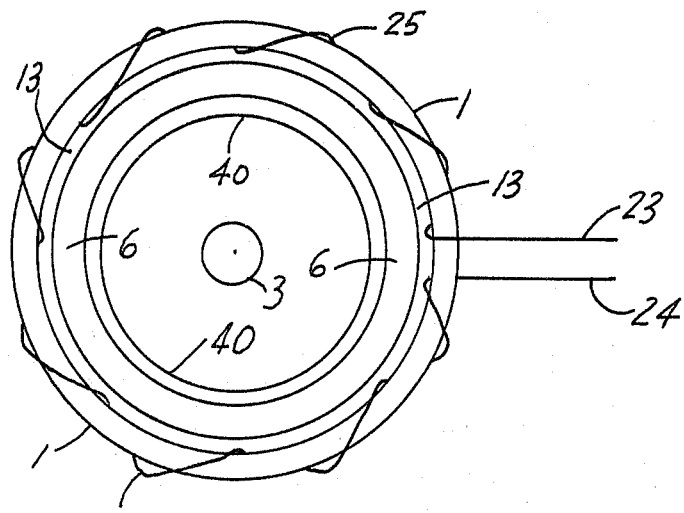
FIG. 5 shows a simplified diagram of a frictional rotational torque transfer device with a friction lining on only the external mating member, according to the invention.

FIG. 5 shows a simplified diagram of a frictional rotational torque transfer device with a friction lining on only the external mating member.

In FIG. 5 an external circular annular magnetic mating member 1 carries an insulated conducting winding 25, with all turns wound in the same direction, with leads 23 and 24. A friction lining 13 is attached internally to member 1 and is notched to pass the turns of winding 25.

Shaft 3 is concentric with, and is attached to, internal circular annular mating member 40. Friction member 13 and internal mating member 40 are separated by annular air gap 6 when energy is not being transferred by friction between members 1 and 40. Air gap 6 is reduced to zero when energy is being transferred by friction.

Since many changes could be made in the above construction and many apparently widely different embodiments of this invention could be made without departing from the scope thereof, it is intended that all matter contained in the above description or shown in the accompanying drawings shall be interpreted as being illustrative only and not limiting.

We claim:

1. A frictional rotational torque transfer device, comprising external and internal circular cylindrical annular mating members, at least one of said members being magnetic and carrying at least one toroidal insulated conducting winding, and at least one of said members carrying a friction lining, which is actuated by changes in mechanical dimensions, caused by circumferential magnetic fields induced in one or both of said mating members of said device, by electric currents in said windings, which change the rotational friction between at least one of said members and at least one of said frictional linings.

2. Said device according to claim 1, which comprises:
said external circular annular magnetic mating member, attached to a first external mechanism, carrying an even number of alternate insulated conducting windings of opposed directions of windings, the total number of turns wound in one of said directions being substantially equal to the total number of turns wound in said opposed direction, and
a first substantially non-magnetic friction lining, internally attached to said external magnetic mating member, and
said internal circular annular magnetic mating member, attached to a second external mechanism, concentric with said external magnetic mating member, carrying at least one insulated conducting winding, all said winding or windings being in series, and generating circumferential magnetic flux in the same direction when carrying direct current, and
a second substantially non-magnetic friction lining, externally attached to said internal magnetic mating member, said first and said second friction linings being separated by an air gap when a substantial current flows in said windings, and being strongly pressed against each other when substantially no current flows in said windings.

3. A frictional rotational torque transfer device according to claim 2, in which said conducting insulated windings are present on only one of said mating members.

4. A frictional rotation torque transfer device according to claim 2, in which at least one of said friction linings is omitted.

5. Said device according to claim 1 which comprises:
said external circular annular magnetic mating member, attached to a first external mechanism, carrying at least one insulated conducting winding, all turns of said winding or windings having the same direction of winding, and
a first substantially non-magnetic friction lining, internally attached to said external magnetic mating member, and
said internal circular annular magnetic mating member, attached to a second external mechanism, concentric with said external magnetic mating member, carrying an even number of alternate insulated conducting windings of opposed directions of windings, the total number of turns wound in one of said directions being substantially equal to the total number of turns wound in said opposed direction, and a second substantially non-magnetic friction lining, externally attached to said internal magnetic mating member, said first and said second friction linings being separated by an air gap, when substantially no current flows in said windings, and being strongly pressed against each other, when a substantial current flows in said windings.

6. A frictional rotational torque transfer device according to claim 5, in which said conducting insulated windings are present on only one of said mating members.

7. A frictional rotational torque transfer device according to claim 5, in which at least one of said friction linings is omitted.

* * * * *